(12) United States Patent
Kachline

(10) Patent No.: US 8,338,753 B2
(45) Date of Patent: Dec. 25, 2012

(54) CONTACT TIP AND DIFFUSER

(75) Inventor: Jeffrey L Kachline, Highland Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 255 days.

(21) Appl. No.: 12/771,663

(22) Filed: Apr. 30, 2010

(65) Prior Publication Data

US 2011/0266259 A1  Nov. 3, 2011

(51) Int. Cl.
*B23K 9/26* (2006.01)
*B23K 9/28* (2006.01)

(52) U.S. Cl. .......... 219/137.61; 219/137.31; 219/137.44

(58) Field of Classification Search ............ 219/121.48–121.55, 121.59, 137.2–137.63
See application file for complete search history.

(56) References Cited

U.S. PATENT DOCUMENTS

| | | | |
|---|---|---|---|
| 3,920,338 A | 11/1975 | Dahl | |
| 5,440,100 A | 8/1995 | Stuart et al. | |
| 5,760,373 A | 6/1998 | Colling | |
| 5,911,894 A | 6/1999 | Colling | |
| 6,147,318 A * | 11/2000 | Marhic | 219/121.52 |
| 6,307,179 B1 | 10/2001 | Walters, III | |
| 6,429,406 B1 | 8/2002 | Sattler | |
| 6,525,297 B2 | 2/2003 | Doherty | |
| 6,847,009 B2 | 1/2005 | Stuart et al. | |
| 7,176,412 B2 * | 2/2007 | Wells | 219/137.61 |
| 7,309,844 B2 * | 12/2007 | Lajoie | 219/137.31 |
| 2005/0218132 A1 | 10/2005 | Wells | |
| 2011/0006048 A1 * | 1/2011 | Ma | 219/137.61 |

FOREIGN PATENT DOCUMENTS

| | | |
|---|---|---|
| CA | 2399537 | 2/2003 |
| EP | 1287937 B1 | 12/2007 |
| GB | 2373472 | 9/2002 |
| JP | 11123559 | 5/1999 |
| WO | 03039800 | 5/2003 |

OTHER PUBLICATIONS

International Search Report; Corresponding Application Serial No. PCT/IB2011/000849; International Filing Date Apr. 30, 2010; European Patent Office.; Issued Sep. 16, 2011 (4 pages).
Written Opinion; Corresponding Application Serial No. PCT/IB2011/000849; International Filing Date Apr. 30, 2010; European Patent Office.; Issued Sep. 16, 2010; (5 pages).
International Preliminary Report on Patentability; Corresponding Application Serial No. PCT/IB2011/000849; International Filing Date Apr. 30, 2012; Authorized Office De Backer, Tom; European Patent Office.; Issued Jul. 11, 2012. (7 pages).

* cited by examiner

*Primary Examiner* — Steven J Fulk
*Assistant Examiner* — Eric Ward
(74) *Attorney, Agent, or Firm* — Benesch, Friedlander, Coplan & Aronoff LLP

(57) ABSTRACT

A contact tip includes a first threaded section and a first non-threaded section. The length of the first non-threaded section is at least a fifth of the length of the first threaded section along a longitudinal axis. The contact tip further includes a first contact surface. A diffuser includes a second non-threaded section and a second threaded section configured to mate with the first threaded section of the contact tip. The diffuser further includes a second contact surface. The first non-threaded section is configured to elongate along the longitudinal axis as the first threaded section is screwed into the second threaded section past a point where the first contact surface and the second contact surface have established contact.

19 Claims, 1 Drawing Sheet

CONTACT TIP AND DIFFUSER

FIELD OF INVENTION

The present disclosure relates generally to the field of Gas Metal Arc Welding (GMAW) or metal inert gas (MIG) welding. More particularly, the present disclosure relates to consumable components known as contact tip and diffuser for use in MIG welding.

BACKGROUND

A MIG welding torch allows a user or robot to direct an electrode metal wire and welding current toward a target workpiece. The electrode metal wire is continuously fed from a spool and consumed as the welding process progresses. Components of a MIG welding torch include consumables such as a contact tip, a nozzle, and a diffuser. The electrode metal wire feeds through a passageway in the contact tip. The welding current flows through the diffuser and the contact tip. The inert gas flows from passages in the diffuser, and the nozzle guides the gas towards the tip of the electrode metal wire.

The contact tip and diffuser are typically attached by threads. Mechanical vibration as well as temperature cycling may cause this threaded connection to loosen.

SUMMARY

A contact tip includes a first threaded section and a first non-threaded section. The length of the first non-threaded section is at least a fifth of the length of the first threaded section along a longitudinal axis. The contact tip further includes a first contact surface.

A diffuser includes a second non-threaded section and a second threaded section configured to mate with the first threaded section of the contact tip. The diffuser further includes a second contact surface.

The first non-threaded section is configured to elongate along the longitudinal axis as the first threaded section is screwed into the second threaded section past a point where the first contact surface and the second contact surface have established contact.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. The drawings are not to scale and the proportion of certain elements may be exaggerated for the purpose of illustration.

DETAILED DESCRIPTION

Figure 1A:
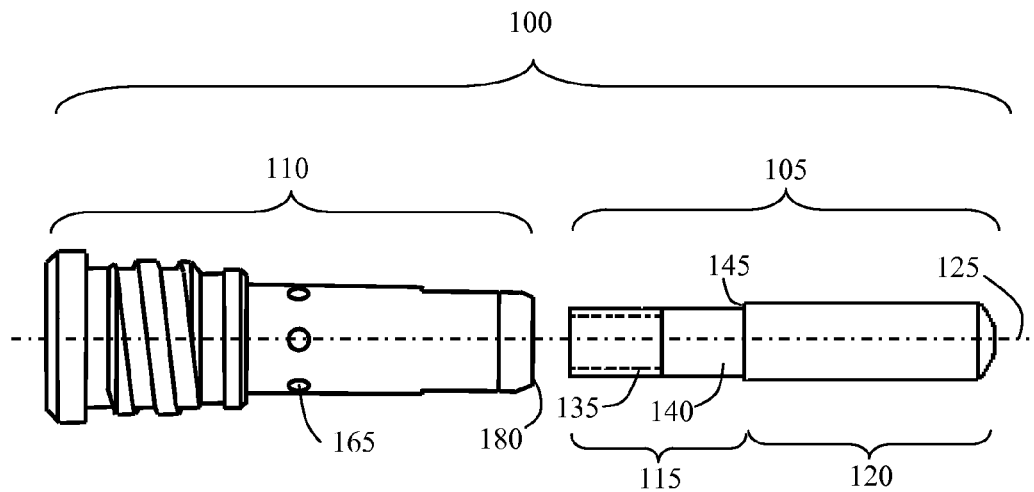
FIG. 1A illustrates an exploded side view of an embodiment of a welding assembly including a contact tip and a diffuser for use with a welding apparatus, such as a welding torch (not shown).
Figure 1B:
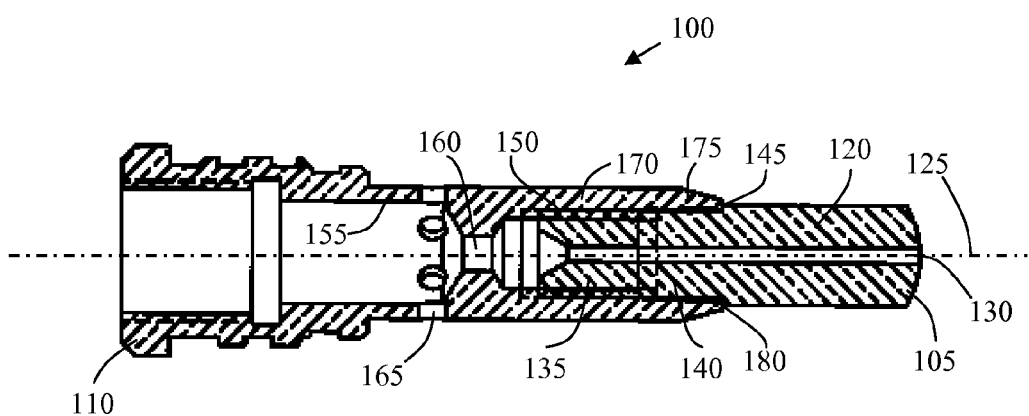
FIG. 1B illustrates a cross section of the embodiment of the welding assembly.

FIG. 1A illustrates an exploded side view of an assembly 100 including a contact tip 105 and a diffuser 110 for use with a welding apparatus, such as a welding torch (not shown). FIG. 1B illustrates a cross sectional view of assembly 100.

Contact tip 105 includes a back portion 115 and a front portion 120. The back portion 115 is located opposite the front portion 120 along a longitudinal axis 125. The contact tip 105 further includes an internal surface defining a bore 130 configured to receive electrode wire (not shown). The bore 130 may be located substantially at the center of the contact tip 105 along the longitudinal axis 125 through the front portion 120 and the back portion 115.

The back portion 115 includes a threaded section 135 and a non-threaded section 140. The threaded section 135 is located at a distal end of the back portion 115. The non-threaded section 140 is located between the threaded section 135 and the front portion 120. In one embodiment, the length of the non-threaded section 140 along the longitudinal axis 125 is at least 0.1 inches. In alternative embodiments, the length of the non-threaded section 140 along the longitudinal axis 125 is at least a fifth of the length of the threaded section 135, at least a fourth of the length of the threaded section 135, at least a third of the length of the threaded section 135, at least half as long as the threaded section 135, or at least 0.2 inches. In one particular embodiment, the length of the non-threaded section 140 along the longitudinal axis 125 is approximately 0.23 inches.

The contact tip 105 further includes a contact surface 145 disposed adjacent to and between the front portion 120 and the non-threaded section 140. In one embodiment, the back portion 115 has a smaller diameter than the front portion 120 and the contact surface 145 is a shoulder between the back portion 115 and the front portion 120. In this embodiment, the contact surface 145 is a substantially flat surface of annular shape configured substantially at a right angle with the non-threaded section 140. In another embodiment, the contact surface 145 is a frusto-conically shaped surface. In other embodiments, the contact surface 145 may have other shapes.

The diffuser 110 includes a first interior surface 150 defining a first chamber and a second interior surface 155 defining a second chamber. The diffuser 110 further includes a third interior surface defining a bore 160 located between the first chamber and the second chamber and providing a passageway between the first chamber and the second chamber. The diffuser 110 further includes a plurality of openings 165 defining a plurality of gas passages from the second interior chamber defined by interior surface 155 to an exterior of the diffuser 110.

The first interior surface 150 includes a mating threaded section 170 configured to mate with the threaded section 135 of the contact tip 105. The first interior surface 150 further includes a non-threaded section 175. The non-threaded section 175 is located at a distal end of the first interior surface 150. The mating threaded section 170 is located between the non-threaded section 175 and the bore 160.

In one embodiment, the length of the mating threaded section 170 of the first interior surface 150 of the diffuser 110 substantially corresponds to the length of the threaded section 135 of the contact tip 105. The non-threaded section 175 may be at least a fifth the length of the mating threaded section 170 along the longitudinal axis 125. In alternative embodiments, the length of the non-threaded section 175 along the longitudinal axis 125 is at least a fourth of the length of the mating threaded section 170, at least a third of the length of the mating threaded section 170, at least half as long as the mating threaded section 170, at least 0.1 inches, or at least 0.2 inches. In one embodiment, the length of the non-threaded section 175 is approximately 0.23 inches.

The diffuser 110 further includes contact surface 180 disposed at a distal end of the diffuser 110 spaced from the mating threaded section 170 and adjacent to the non-threaded section 175. In one embodiment, contact surface 180 is configured substantially at a right angle with the non-threaded section 175. In another embodiment, the contact surface is a substantially flat surface of annular shape. In yet another embodiment, the contact surface 180 is a frusto-conically shaped surface. In other embodiments, the contact surface 180 may have other shapes. Contact surfaces 145 and 180 are configured to establish an electrical connection when the contact tip 105 and the diffuser 110 are mated.

The non-threaded section 140 is configured to elongate along the longitudinal axis 125. The non-threaded section 140 elongates along the longitudinal axis 125 as the threaded section 135 is screwed into the mating threaded section 170 past a point where contact surface 145 and contact surface 180 have first established contact. The elongation of the non-threaded section 140 provides a preload to the connection between the contact tip 105 and the diffuser 110.

Once the contact tip 105 and the diffuser 110 are assembled, welding current may reliably flow through the diffuser and the contact tip. An electrode wire (not shown) may pass through the bore 130 of the contact tip, the bore 160 of the diffuser 105, and the first chamber of the diffuser 105.

In one embodiment, the contact tip 105 and the diffuser 110 are fabricated from copper or a copper alloy.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

While example systems, methods, and so on, have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A welding contact tip and diffuser assembly for use with a welding apparatus, the assembly comprising:
    a contact tip including:
        a front portion,
        a back portion located opposite the front portion along a longitudinal axis of the contact tip, where the back portion includes a first threaded section and a first non-threaded section, where the first threaded section is located at a distal end of the back portion and the first non-threaded section is located between the first threaded section and the front portion, and where the length of the first non-threaded section along the longitudinal axis is at least a fifth of the length of the first threaded section along the longitudinal axis, and
        a shoulder disposed between the front portion and the non-threaded section of the back portion; and
    a diffuser mated with the contact tip, the diffuser including:
        a first interior surface defining a first chamber, where the first interior surface includes a second non-threaded section, and where the first interior surface includes a second threaded section mated with the first threaded section,
        a second interior surface defining a second chamber, and
        a contact surface disposed at a distal end of the diffuser away from the second threaded section and adjacent to the second non-threaded section,
        where the shoulder of the contact tip is in contact with the contact surface of the diffuser, and
    where the first non-threaded section of the contact tip elongates along the longitudinal axis as the first threaded section of the contact tip is screwed into the second threaded section of the diffuser past a point where the shoulder of the contact tip and the contact surface of the diffuser have established contact.

2. The assembly of claim 1, where the length of the first non-threaded section along the longitudinal axis is one of at least a fourth of the length of the first threaded section, at least a third of the length of the first threaded section, at least half as long as the first threaded section, at least 0.2 inches, at least 0.1 inches, and approximately 0.23 inches.

3. The assembly of claim 1, where the contact tip and the diffuser are made of at least one of copper and copper alloy.

4. The assembly of claim 1, where the shoulder of the contact tip is a substantially flat surface of annular shape, substantially at a right angle with the first non-threaded section.

5. The assembly of claim 1, where the contact tip further comprises an internal surface defining a bore configured to receive electrode wire, where the bore is located substantially at the center of the contact tip and extends along the longitudinal axis through the front portion and at least part of the back portion.

6. The assembly of claim 1, where the diffuser further includes a plurality of openings defining a plurality of gas passages from the second interior chamber to an exterior of the diffuser.

7. A contact tip for use with a MIG welding gun, the contact tip comprising:
    a front portion;
    a back portion located opposite the front portion along a longitudinal axis of the contact tip, where the back portion includes a threaded section and a non-threaded section, where the threaded section is located at a distal end of the back portion and the non-threaded section is located between the threaded section and the front portion, and where the non-threaded section is at least a fifth of the length of the threaded section along the longitudinal axis;

an internal surface defining a bore configured to receive electrode wire therethrough, where the bore is located substantially at the center of the contact tip and extends along the longitudinal axis through the front portion and at least part of the back portion; and a shoulder disposed between the front portion and the back portion, configured to mate with a mating surface of a diffuser, where the non-threaded section is configured to elongate along the longitudinal axis as the contact tip is screwed into the diffuser via the threaded section after the shoulder has established contact with the mating surface of the diffuser.

8. The contact tip of claim 7, where the length of the non-threaded section along the longitudinal axis is one of at least a fourth of a length of the threaded section, at least a third of the length of the threaded section, at least half as long as the threaded section, at least 0.1 inches, at least 0.2 inches, and approximately 0.23 inches.

9. The contact tip of claim 7, where the contact tip is made of at least one of copper and copper alloy.

10. The contact tip of claim 7, where the shoulder is configured substantially at a right angle with the non-threaded section.

11. The contact tip of claim 7, where the shoulder is a substantially flat surface of annular shape.

12. The contact tip of claim 7, where the shoulder is a conically shaped surface.

13. A diffuser and contact tip assembly for a MIG welding gun, the assembly comprising:
    a diffuser having:
        a first interior surface defining a first chamber,
        a second interior surface defining a second chamber, and
        a third interior surface defining a bore,
            where the bore is located between the first chamber and the second chamber providing a passageway between the first chamber and the second chamber,
            where the first interior surface includes a threaded section and a non-threaded section,
            where the non-threaded section is located at a distal end of the first interior surface and the threaded section is located between the non-threaded section and the bore, and
            where the non-threaded section is at least a fifth the length of the threaded section along a longitudinal axis of the diffuser,
        a plurality of openings defining a plurality of gas passages from the second chamber to an exterior of the diffuser, and
        a contact surface disposed at a distal end of the diffuser adjacent to the non-threaded section; and
    a contact tip mated with the diffuser, the contact tip having:
        a first exterior surface having a threaded section mated with the threaded section of the first interior surface of the diffuser, and a non-threaded section disposed inside the non-threaded section of the first interior surface of the diffuser,
        a second exterior surface adjacent the non-threaded section of the first exterior surface, and
        a shoulder disposed between the first exterior surface and the second exterior surface, the shoulder being mated with the contact surface of the of diffuser,
            where the contact surface of the diffuser establishes electrical contact with the shoulder of the contact tip, and
            where the non-threaded section of the first exterior surface of the contact tip elongates as the threaded section of the first exterior surface of the contact tip is screwed into the threaded section of the first interior surface of the diffuser past a point where the shoulder of the contact tip mates with the contact surface of the diffuser.

14. The assembly of claim 13, where the length of the non-threaded section of the first interior surface of the diffuser along the longitudinal axis is one of at least a fourth of a length of the threaded section, at least a third of the length of the threaded section, at least half as long as the threaded section, at least 0.1 inches, at least 0.2 inches, and approximately 0.23 inches.

15. The assembly of claim 13, where the diffuser is made of at least one of copper and copper alloy.

16. The assembly of claim 13, where the diffuser is releasably connected to the contact tip.

17. The assembly of claim 13, where the contact surface of the diffuser is substantially at a right angle with the non-threaded section.

18. The assembly of claim 13, where the contact surface of the diffuser is a substantially flat surface of annular shape.

19. The assembly of claim 13, where the contact surface of the diffuser is a conically shaped surface.

\* \* \* \* \*